June 9, 1936.  A. G. HILLMAN  2,043,292
LIGHT DIVIDING DEVICE
Filed April 7, 1933  5 Sheets-Sheet 1

Inventor
Albert George Hillman
By
Nathan, Bowman + Helferich
Attorneys

June 9, 1936.   A. G. HILLMAN   2,043,292
LIGHT DIVIDING DEVICE
Filed April 7, 1933    5 Sheets-Sheet 3

Inventor
Albert George Hillman
By
Nathan, Cannon + Helferich
Attorneys

June 9, 1936.  A. G. HILLMAN  2,043,292
LIGHT DIVIDING DEVICE
Filed April 7, 1933  5 Sheets-Sheet 4

Inventor
Albert George Hillman
By
Nathan, Bowman & Helferich
Attorneys

June 9, 1936.  A. G. HILLMAN  2,043,292
LIGHT DIVIDING DEVICE
Filed April 7, 1933   5 Sheets-Sheet 5

INVENTOR
Albert George Hillman
BY
Nathan, Bowman & Helfrich
ATTORNEYS

Patented June 9, 1936

2,043,292

UNITED STATES PATENT OFFICE 2,043,292

LIGHT DIVIDING DEVICE

Albert George Hillman, London, England, assignor to Colourgravure Limited, London, England Application April 7, 1933, Serial No. 664,943
In Great Britain April 12, 1932

18 Claims. (Cl. 88—1)

The present invention relates to improvements in optical light dividing devices for photography or kinematography, and is particularly applicable to light dividing devices, used before or behind an objective for two or three colour photography or kinematography, employing a perforated non-refracting reflector or reflectors to divide a main beam into component beams so as to produce images simultaneously from the same point (aspect) of view.

In such devices branch beams may be separated from the entering beam of light by reflectors arranged in intersecting planes, a direct beam passing unobstructed to the focal plane, while the branch beams are reflected by polished metallic optical flats, preferably of optical steel, to their respective focal planes, thus producing three images simultaneously from the same point of view, or a single perforated polished metallic reflector may be used permitting part of the light of the entering beam to pass therethrough to the focal plane and form one image and reflecting part of the light to form another image, the reflected image conveniently being brought to the same focal plane as the direct image by the use of a suitably placed additional reflector.

For producing these images by an arrangement of reflectors in intersecting planes the invention particularly deals with an arrangement of such reflectors in V or blunt wedge formation so as to reflect part of the main beam to form two images and permit the other part to pass through the system and form a direct image.

In using a light dividing system in connection with the taking of images for colour work, it is essential for good results that the images simultaneously taken shall be free from "ghost" effects and that the sensitive plates or picture areas shall be substantially uniformly illuminated over the entire effective surface so that a correct blending of the colours shall be realized when the images are superimposed.

The use of polished steel reflectors enables images to be produced free from such ghost effects as are inherently a fault in light-dividing systems involving glass components, but such metallic reflectors must be of a substantial thickness so as to be free from distortion and maintain the high standard of optical accuracy so essential in high class colour work. When such thick metallic reflectors are perforated with tunnel-like holes to permit the passage of direct light to form one of the multiple images, the others being formed by reflected light, the perforations, necessarily having walls of substantial dimensions, ordinarily militate against the free passage of the direct light and particularly of the inclined rays entering the system besides producing flare effects due to the tendency to set up multiple spaced more intensely illuminated areas spotted over the picture area. Moreover if the whole of the perforations were formed with their walls parallel to the optical axis, it would be impracticable to use the system over a desired wide range of stops or apertures, since as the lens aperture becomes smaller the rays are prevented by the walls of the perforations from reaching the marginal portions of the sensitive plate, and an unevenly illuminated direct plate results.

It is an object of the present invention to overcome the foregoing objections, and to provide a light dividing system which will work well over a wide range of stops, for example, of the order between $f/2.5$ and $f/11$ inclusive, which will tend towards obtaining an even illumination of the picture areas or plates with any stop within the range for which the system is designed, and which will obviate or minimize lens flare and will notably minimize the objectionable effects of parallax.

The invention aims to facilitate the passage through the system of the more inclined rays, particularly with small stops, and also to facilitate the design of the reflectors to attain a substantially even illumination and correct apportionment of light to the multiple sensitive plates. It may be here pointed out that the design of the perforated reflectors must be effected with precision to realize the proper apportionment of the light, since it is to be remembered that the light is not divided equally but is so divided that, for example in three colour work, the image behind the green filter receives a greater portion of the available light than the image behind either the blue or red filter, while the image behind the red filter must receive more light than that behind the blue. Such an apportionment is on the basis of full day-light or white arc-light, and in such light the ratio of the light division may be taken approximately as follows: 7 units, red; 3 units, blue; 10 units, green. Where half watt lamps are used there will be a preponderance of red actinic rays and it will be generally found satisfactory to reverse the red and blue filters.

In the case of a behind-lens perforated light dividing system with the reflectors disposed obliquely to the optical axis of the lens, the conical beam of light emerging from the lens of any point in the scene or object is divided by the system into pencils of light converging to the focal plane. If the apertures in the reflectors are formed with their walls parallel to the optical axis, the more inclined pencils, viz., those inclining towards the margins of the picture area or plate, are obstructed by the walls and consequently the medial area of the direct-image receiving surface, already illuminated more than the margins by lens flare, receives considerably more light than the margins of the plate.

It has been proposed to taper the walls of the holes towards the reflecting plane, and obstruction of the more inclined pencils is thereby avoided or minimized and as much light, both of the more inclined and less inclined pencils, is allowed to pass as possible. The result is that there is still a balance of light to the medial area of the direct image.

With a before lens system having the reflector or reflectors obliquely disposed to the optical axis of the objective and the holes formed as above stated, the parallel rays or less inclined pencils of light produced by the reflector device pass more readily than the more inclined pencils and it is not possible to attain even illumination of the direct image.

The present invention is broadly characterized by providing the non-refracting light dividing reflector device with an arrangement of tapered apertures whose non-reflecting walls have portions so inclined to the optical axis towards the margins of the direct image-receiving surface as to facilitate the passage of the light pencils passing to the marginal parts of the direct-image receiving surface and have portions which intrude in the path of and partially obstruct the passage of light pencils to the medial part of such surface.

By this means it is possible, using one or more reflectors computed to provide an even illumination of the reflected image or images, to obtain a uniformly illuminated direct image, the evenly illuminated images and the degree of sharpness permitted by the non-refracting reflectors, resulting in an excellent colour blending and reproduction of the scene or object when the multiple images are superposed.

One important aspect of the present invention consists in a behind lens light-dividing system comprising a V formation of non-refracting mirrors having a multiplicity of apertures whereby to form two reflected images and a direct image, the mirrors each having multiple apertures whose walls expand from the reflecting plane and are so differently inclined as to facilitate the passage of the light pencils to the marginal parts of the direct-image receiving surface whilst partially obstructing the passage of the light pencils to the medial part of such surface, the apertures in one mirror leaving a greater reflecting area than those in the other and so varying in size in each mirror as to provide for a progressive decrease in the respective reflecting areas as the distance therefrom to the objective increases, the tapering of the walls of the holes being varied in one mirror with respect to the other to compensate the direct image for the difference between the total aperture area in the reflecting plane of one mirror with respect to that in the other for the purposes described.

The attainment of the results aimed at by the present invention is realized by inclining the axes, and where necessary differently inclining local portions of the walls, of some or all of the multiple perforations with respect to the optical axis in such a way that inclined rays are free to reach the margins of the picture area despite stopping down of the objective.

The manner of forming such holes will depend on the particular use of the reflector device, whether for photography or kinematography, and on the focus of the objective or objectives employed.

In general the inclination of the axes or general direction of the holes with respect to the optical axis will increase inversely with the focus of the objective. The design of the holes will also depend on the dimensions of the picture area in relation to the reflector device.

For instance in the case of the V-mirror formation hereinafter described for three colour photography a group of holes suitably spaced around the optical axis and occupying oblique areas extending to the corners of the system will have their axes inclined towards the corresponding corner of the plate and it is found that good results are obtained when the holes assume one or other of three directions, the marginal holes and a central row being drilled with their axes substantially parallel to the optical axis and the other holes having their axes intersecting in front of the system a plane which contains the optical axis and bisects the reflector faces, the axes of the holes on a given side of such plane being substantially in parallelism in any one reflector.

In the hereinafter described system for use in two colour cinematography, in conjunction with which lenses of the usual very short focus will be used, it is found suitable to arrange the whole series of holes with their axes inclined with respect to the optical axis in one direction, local portions of the walls of such holes being appropriately cut away to permit inclined rays to pass to those marginal portions of the plate other than the marginal portions favoured by the general inclination of the holes.

Such a system can be so disposed as to facilitate the passage of ground light by sloping the axes towards the ground, the lower portion of the walls of the holes intruding into the path of the less inclined pencils of light or those parallel to the optical axis and having local enlargements formed in such portions which allow a predetermined amount of bright sky light to reach the picture area. The holes may increase in size as the distance therefrom to the objective increases so as to tend to equalize the unbalancing effect of the different location of the holes from the objective by the angular setting of the reflector with respect to the objective.

In order that the invention may be the more readily understood, reference is hereinafter made to the accompanying drawings, in which Figs. 1 to 11 show one form of the invention suitable for three-colour photography, and Figs. 12 to 17 another form of the invention suitable for two colour cinematography.

Fig. 15a is a view on an enlarged scale of a picture area or frame of a cinematograph film hereinafter referred to.

Figure 1:
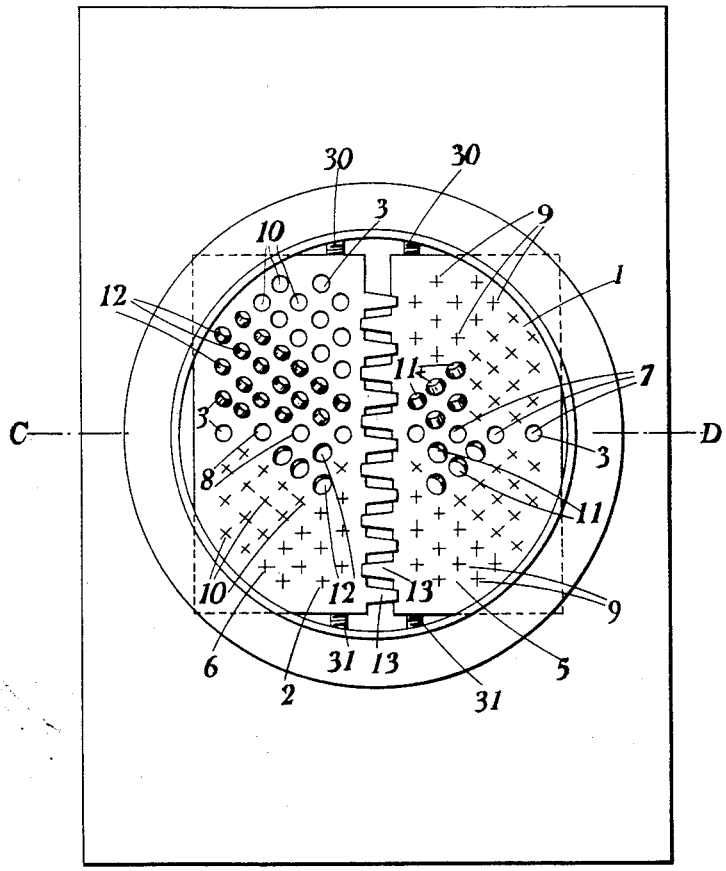
Fig. 1 is a front elevation with the objective removed, Fig. 2 a side elevation and Fig. 3 a plan of the system mounted on the panel of the objective.

Referring to Figs. 1 to 11, the light dividing system here comprises a pair of reflectors 1, 2 in substantially V or wedge formation, the reflectors having multiple perforations 3. The reflectors are shown positioned behind an objective 4 so as to divide the beam of light coming from the objective, a part of such beam being reflected by the reflector 1 to form one image, another part by the reflector 2 to form a second image, and the remainder passing through the perforations for the production of the direct image.

The reflectors in the example illustrated are of approximately .16" in thickness.

The multiple perforations 3 are tapered or expanded rearwardly from the polished reflecting front surfaces 5, 6, and the triangular series of holes 11, 12 are formed with their axes inclined to the optical axis, the axes of those of the triangular series of holes 11, 12 in a given reflector above the transverse centre line C—D of the reflectors inclining downwardly substantially in parallelism and the axes of the triangular series of holes 11, 12 in a given reflector below such centre line inclining upwardly substantially in parallelism. Thus if a plane be taken which contains the optical axis Y—Z and the transverse centre line of each mirror, then the axes of all the holes 11 and 12 will intersect such plane in front of the reflector. The axes of the holes 7, 8, 9, 10 do not intersect such a plane.

The portions of the walls of the holes 11, 12 nearer to the optical axis are disposed so as to intercept some part of the less inclined pencils of light produced by the system and the disposition of such walls and the amount of light they obstruct can be readily so varied as required to cause a substantially even distribution of the light to the picture area of the direct image.

Usually only those perforations which lie within the angle of vision at the smaller apertures for which the system is designed, e. g., between $f/8$ and $f/11$, have their axes so inclined, the marginal perforations 9, 10 which have their axes substantially parallel to such plane containing the optical axis Y—Z and the transverse centre line of each mirror being shut off at such small apertures.

Figure 2:
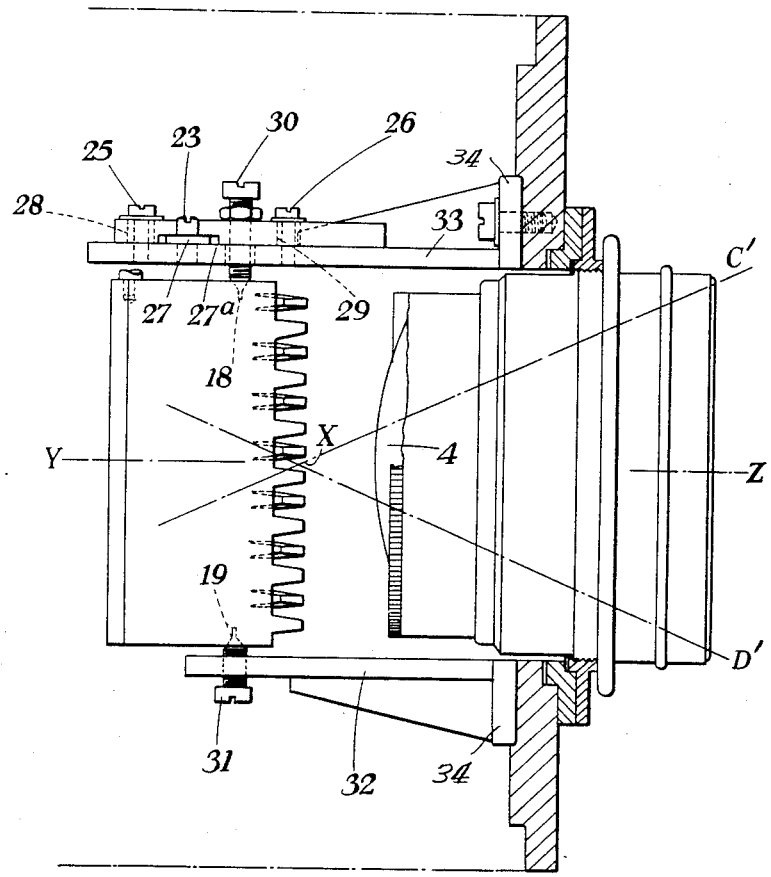
Figure 3:
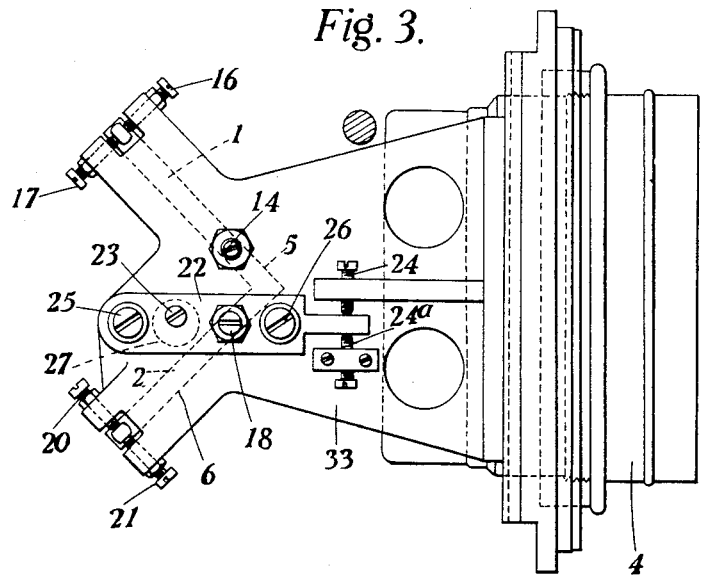
Figure 5:
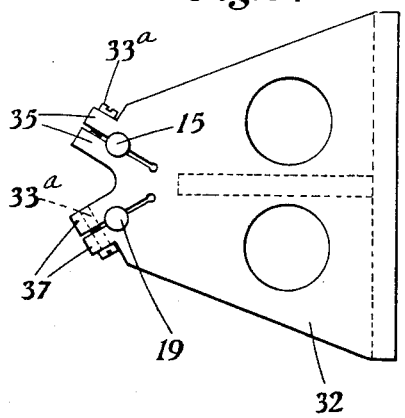
Fig. 5 is a detail view of a mounting member for the light divider.
Figure 10:
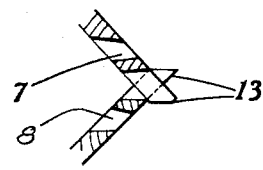
Fig. 10 is a part sectional view of the intersecting mirrors, and Fig. 11 an enlarged sectional view of one of the reflectors.
Figure 4:
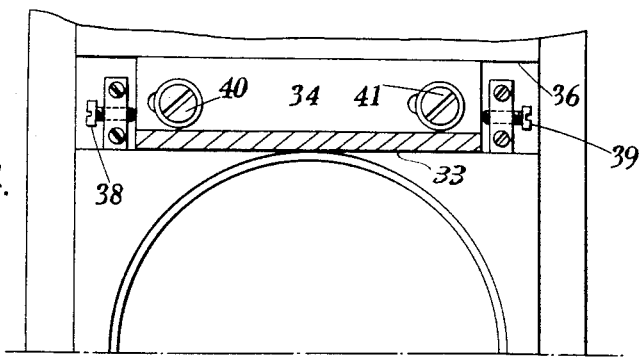
Fig. 4 is a view looking towards the rear of the objective.

The size and shape of the reflecting surfaces will depend on the sensitive plates used, but for rectangular plates the reflectors 1, 2 are of rectangular form arranged in the form of a blunt wedge directed towards the objective with the edge of the wedge lying substantially perpendicular to and intersecting or lying near to the optical axis. In this arrangement it is convenient for the longer dimension of the reflector to be vertical and parallel, or substantially so, with the longer dimension of the plate, the longer dimension of the reflectors thereby taking the larger angle of vision. The system 1, 2 is mounted close to the objective 4 with the meeting edges of the reflectors passing through or lying near the point where the outside rays C1, D1 defining the larger angle of vision of the lens at full aperture intersect on the optical axis behind the lens. If the system is arranged substantially nearer to the objective 4 than is shown in Fig. 2, inclined rays will be reflected on to the rear face of the objective, whence they will stray on to the plate and produce "ghost" effects; moreover some part of the light from the reflectors would be liable to be obstructed by the lens mount, and the corresponding plates badly illuminated near one edge.

It will be observed that when the aperture of the objective is stopped down, the marginal perforations are excluded from the angle of vision of the objective but the particular formation and disposition of the perforations 11, 12 will permit inclined rays a ready passage through the system to the marginal areas of the directly illuminated sensitive plate.

Apart from this advantage however the particular tapering formation of the perforations has the important additional advantage of facilitating the proportioning of the system to obtain correct division of the light. This will be apparent from the following explanation.

To accommodate for the different filter factors for the two reflected images, the perforations in the reflector 2 e. g., for the green image are somewhat smaller than those in the other reflector, so that a greater reflecting area is provided for the rays which form the green image. But this in itself does not suffice to promote even illumination, for when the lens is stopped down, and the emergent beams for any particular point of view are in the form of fine cones of light, the cross sectional area of these cones decreases from the meeting edges of the reflectors to the rear edges thereof. To allow for this, the perforations are so formed that in each plate they progressively increase in diameter in proportion as the distance between the perforations and the objective increases. Thus the rows of holes nearest the meeting edges will be of the smallest diameter, the successive rows then increasing in each reflector to the back edges thereof.

Thereby compensation is made to the reflector factors for the increasing intensity of the converging beams and a larger reflecting surface per unit area is provided in the region of the reflectors close to the lens from which a greater area of plate has to be covered than from the regions of the reflectors more remote from the lens.

Having obtained an arrangement of holes which will give even illumination of the reflected images, the even illumination of the direct image can be attained by appropriately enlarging or tapering the walls of the perforations without affecting the dimensions of the reflecting areas.

Figure 6:
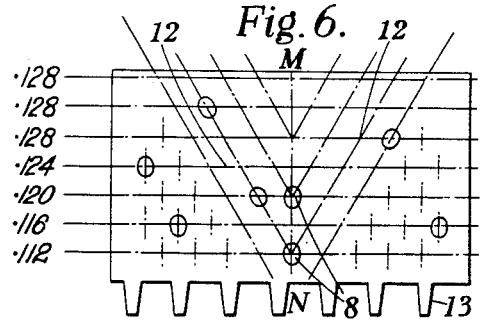
Figs. 6 and 7 show face views of the two reflectors.
Figure 8:
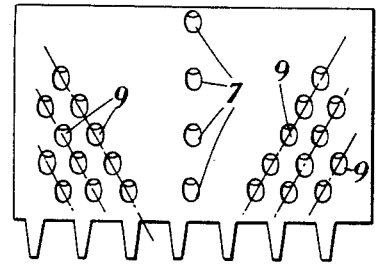
Figs. 8 and 9 are face views showing the disposition of the variously drilled groups of holes of one reflector.
Figure 7:
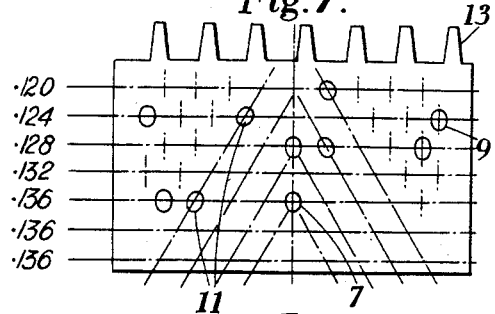

Figs. 6 to 9 show a suitable arrangement of holes, the dimensions of the holes in each row being marked adjacent thereto in Figs. 6 and 7. This arrangement is found to work well using reflectors having a length of 2.25" and breadth of 1.60" excluding the prongs and an objective of approximately 6" focus.

A convenient method of obtaining a satisfactory distribution of the light is first to provide multiple evenly spaced like holes in the reflectors and then to enlarge the holes as required so as to compensate for variations of the filter factors and reflection losses.

Figure 9:
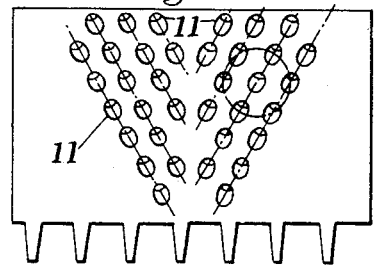
Figure 11:
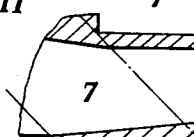

A suitable even spacing of the holes in the reflector is one in which the holes are so disposed that around any one hole other than the marginal holes a circle may be described which cuts through the equi-distant centres of six other holes, as shown in Fig. 9.

It is convenient to take the smallest stop as a basis for setting out the multiple perforations. Thus with a smallest stop of ½" diameter, this may be made the diameter of the circles above referred to.

In commencing to mark out the position of the holes a centre line M—N is taken across each reflector surface perpendicular to the meeting edges of the two reflectors and the first hole comes with its centre on this line at a position near to the said meeting edges dependent on the focal length of the lens used. The first ½" diameter circle is described from this centre and lines are taken, one on each side of the centre line at an angle of 30° thereto, which intersect the centre line at the centre of the first hole. The points where these lines intersect the first circle struck provide the centres of further perforations and with these points as centres further circles are described and lines taken parallel to the first two oblique lines to provide the centres of the whole series of perforations.

In forming the perforations in stainless steel reflectors, which are for preference used in the system it is not convenient to vary the inclination of the wall of each hole with respect to the wall of each other hole, but a practicable method of perforating the reflectors which satisfactorily transmits more inclined rays coming from different points around the optical axis is as follows:

The reflector combination is set with the meeting edges lying in a horizontal plane and the reflector surfaces lying at 45° thereto. The holes 7, 8 along the centre lines and marginal holes 9, 10, which mainly lie outside the angle of vision of the smaller stops, e. g., outside the stops between f/11 and f/8, are then formed with the drilling tool (indicated by the arrow A in Fig. 11) horizontal and perpendicular to the vertical plane containing the meeting edges. The combination is then turned through 30° about an axis C—D (Fig. 1), which lies perpendicular to the meeting edges and in a common plane with the transverse centre lines of the reflectors, first on one side of the original position then on the other, and the holes 11, 12 lying within the aforesaid angle are formed with the tool in the same direction as before. In the above description it is considered for the sake of clarity that the two reflectors are assembled and then perforated.

The holes are relieved from the back towards the margins of the system, for example, through a total angle of approximately 13°, which is the apex angle of the conical tool used, the angle being somewhat greater for the holes in one plate than for those in the other, in order to obtain even illumination of the direct plate despite the fact that the apertures in one reflecting face are relatively larger than those in the other.

The meeting edges of the reflectors may be provided with interdigitated tongues or extensions 13 preferably shaped and spaced to provide a series of elongated or rectangular spaces or notches which lie in place of what would be a line of perforations if the system were constructed without tongues and with two straight meeting edges. This construction assists in realizing uniform illumination and permits the system to be positioned closer to the lens.

To facilitate drilling the perforations, the reflectors may be suitably stepped to provide a front face perpendicular to the axis of the drilling tool, (see Fig. 11), the steps being subsequently ground off, but the drilling in multiple directions may be effected without such stepping in a suitable jig.

The system may be pivotally mounted on a support with the lens as a complete unit with means for adjusting the reflectors relatively to one another and as a unit in multiple directions, including provision for off-setting the system with respect to the optical axis to assist in controlling the balance of light to the respective plates.

The mirror 1 is rotatably mounted about pivots 14, 15, being rotated and locked in an adjusted position by the screws 16, 17.

The mirror 2 is rotatably mounted about the pivots 18, 19 and controlled and locked by screws 20, 21.

To provide for adjustment of the separation of the pivots 14 and 18 the pivot 18 is mounted on a pivoted arm 22, which, when clamping screws 25 and 26 have been released, can be turned about a pivot 23 and locked by screws 24, 24a. A further adjustment of the mirror 2 can be effected by means of an eccentric 27 which is mounted to rotate with the pivot 23, and which, when rotated by the screw 23 after a screw 24 or 24a and the clamping screws 25, 26 have been released, acts against a wall of a slot 27a in the arm 22 and shifts the arm towards or away from the objective. The clamping screws 25, 26 have sufficient freedom in the holes 28, 29 in the arm to permit this movement.

In order to permit the system to be moved with respect to the optical axis, each reflector can be moved up or down i. e., vertically of Fig. 1, independently of the other by means of adjusting screws 30, 31, the screws 31 in the bottom plate 32 being set in their adjusted position by locking screws 33a which tighten the split clamp portions 35, 37 around the screws 31. The screws 30, 31 form the pivots 14, 15, 18, 19 above described. The system can also be moved bodily in a lateral direction of Fig. 1. For this purpose the bottom plate 32 and the top plate 33 between which the mirrors are held, are provided with shoes 34, sliding in guides 36, the adjustments being effected by screws 38, 39, clamping screws 40, 41 being provided to retain the shoes in the desired adjusted position.

Figure 17:
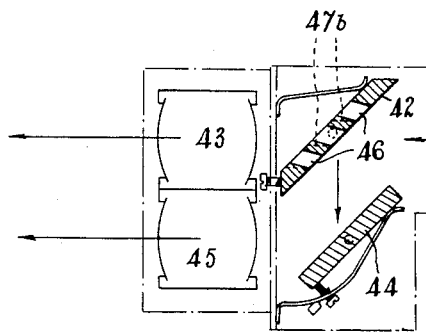
Fig. 17 shows an optical system incorporating a reflector according to Figs. 12 to 16.

Fig. 17 shows another application of the invention to a system for taking simultaneously two negative images on a standard size cinematograph film.

The system comprises a reflector 42 which is perforated to allow part of the entering beam to pass therethrough and thence through the lens 43 to the focal plane, the other part of the beam being reflected from the reflector 42 on to the reflector 44, and thence through the lens 45 to the focal plane.

Figs. 12 to 16 show a suitable form of reflector 42 made according to this invention.

Figure 13:
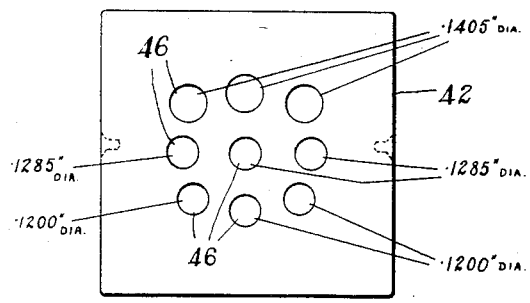
Figure 12:
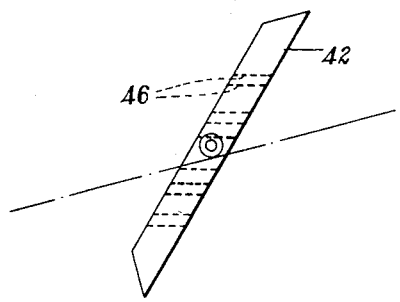
Fig. 12 is a side view and Fig. 13 a front view of a reflector for use in two colour cinematography, the reflector and the optical axis being tilted to show the reflector in a position for drilling the holes.
Figure 14:
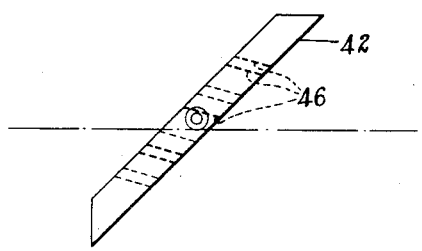
Figs. 14 and 15 are side and rear views of the same reflector in its normal position.

The reflector is formed with multiple holes 46 the top row (Fig. 13) viz., those farthest from the lens being of the greatest diameter and the other rows progressively decreasing in size. The diameter for the three rows in the particular reflector illustrated are indicated in Fig. 13, the length of this reflecting face being 1¼" and the breadth 1⅛", the focus of the lenses being two inches.

All the holes are drilled so that their axes are inclined to the optical axis when the reflector is related to its objective. The holes may be drilled by tilting the reflector into the position shown in Fig. 12 and drilling with a tool presented horizontally.

Such an inclined aspect of the holes with respect to the optical axis will favour the marginal portions of one half A of the picture area (Fig. 15a), e. g., that illuminated by ground light, and in order to realize an effective and even illumination of the marginal portions of the other half B of such picture area, e. g., that receiving bright top light, the holes are locally expanded rearwardly such as by a conical tool, without disturbing the reflecting area of the front reflecting face, to produce part conical channels or indentations 47 (a, b) in the walls of the holes, such channels 47 (a, b) being variously inclined so as directionally to control the light to the margins.

Figure 15:
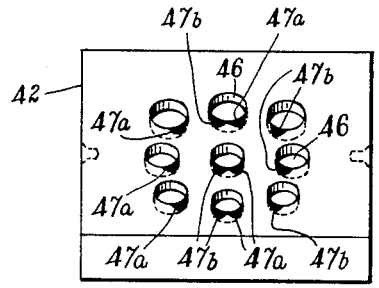
Figure 15A:
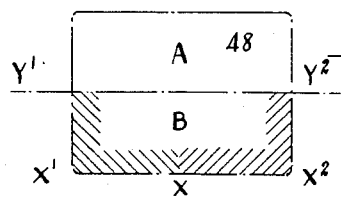
Figure 16:
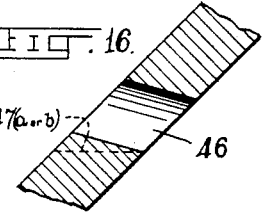
Fig. 16 is a part sectional view through one of the holes.

Thus referring to Figs. 15 and 15a the channels 47a are suitably inclined to allow light to reach and illuminate the marginal portions of the picture area 48 between X, $X^2$ and $Y^2$ and the channels 47b are suitably inclined to illuminate the marginal portions X, $X^1$, $Y^1$ while lower portions of the walls of the holes lie behind the openings in the reflecting plane and partially interrupt the parallel or less inclined rays. Obviously by varying the size and inclination of the holes and the channels a close control on the distribution of the light is possible without affecting the even illumination predetermined for the reflected image.

The central hole of the system is provided with channels 47a and 47b, as also are the central holes in the top and bottom rows, and such central hole is itself capable of permitting light to pass to all parts of the picture area. Only a very slight channelling of the medial hole in the bottom row is ordinarily necessary.

The lens can be stopped down without causing a lack of effective illumination of the margins of the picture area and the light is caused to reach such margins at the expense of the light which normally tends to concentrate at the medial part of the picture area.

What I claim is:—

1. An optical system for taking multiple images by simultaneous exposure from the same aspect of view comprising in combination with an objective a non-refracting optical light-dividing reflector device, a multiplicity of perforations therein which diminish in size through the reflector thickness towards the reflecting plane, said perforations having non-reflecting walls, portions of said walls inclining rearwardly away from the optical axis to facilitate the passage of the light pencils produced by the device of the more inclined rays within the angle of view, and other portions of said walls being arranged to intrude in the path of and partially obstruct the passage of the light pencils of the less inclined rays so that the light passing through the perforations is substantially uniformly distributed over the area receiving the image formed by such light.

2. An optical system for casting multiple images from the same aspect of view comprising an objective and a light dividing device positioned behind the objective; said light dividing device consisting of a pair of non-refracting reflectors arranged in V-formation presented towards the objective, a multiplicity of light-transmitting apertures in each of said reflectors, said apertures having walls which expand from the reflecting plane and are differently inclined to facilitate the passage through the device of the light pencils produced thereby of the more inclined rays within the angle of view, said walls having portions which partially obstruct the light pencils of the less inclined rays.

3. An optical system for casting multiple images from the same aspect of view comprising an objective and a light dividing device positioned behind the objective; said light dividing device consisting of a pair of non-refracting reflectors arranged in V-formation presented towards the objective, a multiplicity of light-transmitting apertures in each of said reflectors, said apertures having walls which expand from the reflecting plane and are inclined to facilitate the passage through the device of the light pencils produced thereby of the more inclined rays within the angle of view, said walls having portions which partially obstruct the light pencils of the less inclined rays, the axes of different apertures intersecting in front of the device a plane which contains the optical axis of the objective and bisects the reflector faces, such axes of a multiplicity of apertures on either side of such plane and in any one reflector being substantially in parallelism.

4. An optical system for casting multiple images from the same aspect of view comprising an objective and a light dividing device positioned behind the objective; said light dividing device consisting of a pair of non-refracting reflectors arranged in V-formation presented towards the objective, said reflectors reflecting part of the main beam transmitted by the objective in different directions to form two reflected images, a multiplicity of light-transmitting apertures in each of said reflectors through which light from the objective passes to form a direct image, said apertures having walls which expand from the reflecting plane and are differently inclined to facilitate the passage through the device of the light pencils produced thereby of the more inclined rays within the angle of view, said walls having portions which partially obstruct the light pencils of the less inclined rays, the apertures being relatively larger in one reflector than in the other, and progressively increasing in size in each reflector as the distance from the aperture to the objective increases, the divergence of the aperture walls being greater in the reflector having the smaller apertures.

5. An optical system for casting multiple images from the same aspect of view comprising an objective and a light dividing device positioned behind the objective; said light dividing device consisting of a pair of non-refracting reflectors arranged in V-formation presented towards the objective, said reflectors reflecting part of the main beam transmitted by the objective in different directions to form two reflected images, said reflectors at their meeting edges having prongs in interdigitated relationship those on one reflector with those on the other, said prongs leaving a row of openings therebetween, a multiplicity of light-transmitting apertures in each of said reflectors through which light from the objective passes to form a direct image, said apertures having walls which expand from the reflecting plane and are differently inclined to facilitate the passage through the device of the light pencils produced thereby of the more inclined rays within the angle of view, said walls having portions which partially obstruct the light pencils of the less inclined rays.

6. An optical system for casting multiple images from the same aspect of view comprising an objective and a light dividing device positioned behind the objective; said light dividing device consisting of a pair of non-refracting reflectors arranged in V-formation presented towards the objective, said reflectors reflecting part of the main beam transmitted by the objective in different directions to form two reflected images, a multiplicity of light-transmitting apertures in each of said reflectors through which light from the objective passes to form a direct image, said reflectors at their meeting edges having prongs in interdigitated relationship those on one reflector with those on the other, said prongs leaving a row of openings therebetween.

7. An optical system for casting multiple images from the same aspect of view comprising an objective and a light dividing device positioned behind the objective; said light dividing device consisting of a pair of non-refracting reflectors arranged in V-formation presented towards the objective, said reflectors reflecting part of the main beam transmitted by the objective in different directions to form two reflected images, a multiplicity of light-transmitting apertures in each of said reflectors through which light from the objective passes to form a direct image, said reflectors being each rotatably mounted, means for rotating them, means for adjusting the separation of said reflectors, means for axial adjustment, means for vertically adjusting said reflectors, and a slide-guided carrier for said reflectors, and means for adjusting said carrier laterally, and means for locking the reflectors and their carrier in the desired position of adjustment.

8. An optical system for taking two images by simultaneous exposure from the same aspect of view comprising a non-refracting optical light-dividing reflector, an objective behind said reflector, said reflector being obliquely disposed with respect to said objective and having a multiplicity of perforations therein which diminish in size through the reflector thickness towards the reflecting plane, said perforations permitting light to pass through and be transmitted by the objective to form an image, said perforations having non-reflecting walls, portions of said walls inclining rearwardly away from the optical axis to facilitate the passage of the more inclined pencils, and other portions of said walls being arranged to intrude in the path of and partially obstruct the passage of less inclined light pencils, a second non-refracting reflector arranged in a plane parallel or substantially parallel with said perforated reflector, an objective for said second reflector, said second reflector receiving light reflected from said perforated reflector and reflecting it on to its appertaining objective through which it is transmitted to form a second image in the same focal plane as the direct image.

9. An optical system for casting multiple images from the same aspect of view comprising an objective and a light dividing device positioned behind the objective; said light dividing device consisting of a pair of non-refracting reflectors arranged in V-formation presented towards the objective, said reflectors reflecting part of the main beam transmitted by the objective in different directions to form two reflected images, said reflectors at their meeting edges having interdigitated extensions which leave a row of openings between them, a multiplicity of light-transmitting apertures in each of said reflectors through which light from the objective passes to form a direct image, said apertures having walls which expand from the reflecting plane and are differently inclined to facilitate the passage through the device of the light pencils produced thereby of the more inclined rays within the angle of view, said walls having portions which partially obstruct the light pencils of the less inclined rays, the apertures being relatively larger in one reflector than in the other, and progressively increasing in size in each reflector as the distance from the aperture to the objective increases, the divergence of the aperture walls being greater in the reflector having the smaller apertures.

10. An optical system for casting multiple images by simultaneous exposure from the same aspect of view comprising an objective and a light dividing device positioned behind the objective; said light dividing device consisting of a pair of non-refracting reflectors arranged in V-formation presented towards the objective, each reflector having a multiplicity of light-transmitting holes with non-reflecting walls diminishing in cross-sectional area through the thickness of the reflectors to the reflecting faces thereof, the axes of different holes being inclined to the optical axis and intersecting in front of the device a plane which contains the optical axis of the system and bisects the reflector faces, such axes of a multiplicity of holes on either side of such plane and in any one reflector being substantially in parallism.

11. An optical system for taking images by simultaneous exposure from the same aspect of view comprising a non-refracting optical light-dividing reflector, an objective located behind said reflector, said reflector being obliquely disposed with respect to said objective, and having a multiplicity of perforations therein through which light passes and is transmitted by the objective to form an image, the axes of said perforations being inclined with respect to the optical axis of said objective in the direction of one portion of the picture area to be illuminated, said perforations having non-reflecting walls, portions of said walls being locally relieved without disturbing the reflecting face to permit the passage of light to an opposite portion of said picture area, and to leave portions of said walls which intrude in the path of and partially obstruct the passage of light pencils to the medial part of the picture area.

12. An optical system for taking images by simultaneous exposure from the same aspect of view comprising a non-refracting optical light-dividing reflector, an objective located behind said reflector, said reflector being obliquely disposed with respect to said objective, and having a multiplicity of perforations therein through which light passes and is transmitted by the objective to form an image, the axes of said perforations being inclined with respect to the optical axis of said objective in the direction of one portion of the picture area to be illuminated, said perforations having non-reflecting walls, portions of said walls being locally relieved without disturbing the reflecting face to permit the passage of light to an opposite portion of said picture area, and to leave portions of said walls which intrude in the path of and partially obstruct the passage of light pencils to the medial part of the picture area, a second reflector on to which light is incident from the perforated reflector, and an objective which receives such light from the second reflector and produces an image in the same focal plane as said first image.

13. An optical system for taking images by simultaneous exposure from the same aspect of view comprising a non-refracting optical light-dividing reflector, an objective located behind said reflector, said reflector being obliquely disposed with respect to said objective, and having a multiplicity of perforations therein through which light passes and is transmitted by the objective to form an image, the axes of said perforations being inclined with respect to the optical axis of said objective in the direction of one portion of the picture area to be illuminated, said perforations having non-reflecting walls, portions of said walls being locally relieved without disturbing the reflecting face to permit the passage of light to an opposite portion of said picture area, and to leave portions of said walls which intrude in the path of and partially obstruct the passage of light pencils to the medial part of the picture area, said perforations increasing progressively in size as the distance therefrom to the objective increases.

14. An optical system for taking images by simultaneous exposure from the same aspect of view comprising a non-refracting optical light-dividing reflector, an objective located behind said reflector, said reflector being obliquely disposed with respect to said objective, and having a multiplicity of perforations therein through which light passes and is transmitted by the objective to form an image, the axes of said perforations being inclined with respect to the optical axis of said objective in the direction of one portion of the picture area to be illuminated, said perforations having non-reflecting walls, portions of said walls being locally relieved without disturbing the reflecting face to permit the passage of light to an opposite portion of said picture area, and to leave portions of said walls which intrude in the path of and partially obstruct the passage of light pencils to the medial part of the picture area, a second reflector on to which light is incident from the perforated reflector, and an objective which receives such light from the second reflector and produces an image in the same focal plane as said first image, at least one of said reflectors being rotatably mounted, and means for rotating said reflector and means for locking said reflector in a desired position of adjustment.

15. An optical light dividing system for taking images by simultaneous exposure from the same point (aspect) of view comprising a non-refracting optical light-dividing reflector device perforated with multiple holes which diminish in size through the reflector thickness towards the reflecting plane or planes, characterized by an arrangement of holes whose non-reflecting walls have portions so inclined to the optical axis towards the margins of the direct image-receiving surface as to facilitate the passage of the light pencils passing to the marginal parts of the direct-image receiving surface and have portions which intrude in the path of and partially obstruct the passage of light pencils to the medial part of such surface so that the light passing through the holes is substantially uniformly distributed over the area receiving the image formed thereby.

16. A behind lens light dividing system for three colour photography or cinematography comprising a V-formation of non-refracting mirrors having a multiplicity of apertures whereby to form two reflected images and a direct image, the mirrors each having multiple apertures whose walls expand from the reflecting plane and are so differently inclined as to facilitate the passage of the light pencils to the marginal parts of the direct-image receiving surface whilst partially obstructing the passage of the light pencils to the medial part of such surface, the apertures in one mirror leaving a greater reflecting area than those in the other and so varying in size in each mirror as to provide for a progressive decrease in the respective reflecting areas as the distance therefrom to the objective increases, the tapering of the walls of the holes being varied in one mirror with respect to the other to compensate the direct image for the difference between the total aperture area in the reflecting plane of one mirror with respect to that in the other for the purposes described.

17. An optical system for casting multiple images from the same aspect of view comprising an objective and a light dividing device positioned behind the objective; said light dividing device consisting of a pair of non-refracting reflectors arranged in V-formation presented towards the objective, said reflectors reflecting part of the main beam transmitted by the objective in different directions to form two reflected images, a multiplicity of light-transmitting apertures in each of said reflectors through which light from the objective passes to form a direct image, said apertures having walls which expand from the reflecting plane, a group of said apertures occupying obliquely lying areas extending from near the centre towards the corners of the device having axes which are inclined to the optical axis and intercept in front of the reflectors the plane containing the optical axis of the objective and bisecting the reflector faces, and medial vertical and horizontal rows and a marginal series of said apertures whose axes do not intersect such plane.

18. An optical system for taking multiple images by simultaneous exposure from the same aspect of view comprising in combination with an objective a non-refracting optical light-dividing reflector device, a multiplicity of perforations arranged in circular series therein which diminish in size through the reflector thickness towards the reflecting plane, said perforations having non-reflecting walls, portions of said walls inclining rearwardly away from the optical axis to facilitate the passage of the light pencils produced by the device of the more inclined rays within the angle of view, and other portions of said walls being inclined with respect to the optical axis so as to lie behind the openings formed by said perforations in the reflecting face and partially obstruct the passage of the light pencils of the less inclined rays and said openings being progressively of greater size as the distance therefrom to the objective increases, so as to obtain substantially even illumination of the direct and reflected images.

ALBERT GEORGE HILLMAN.